Figure 1:
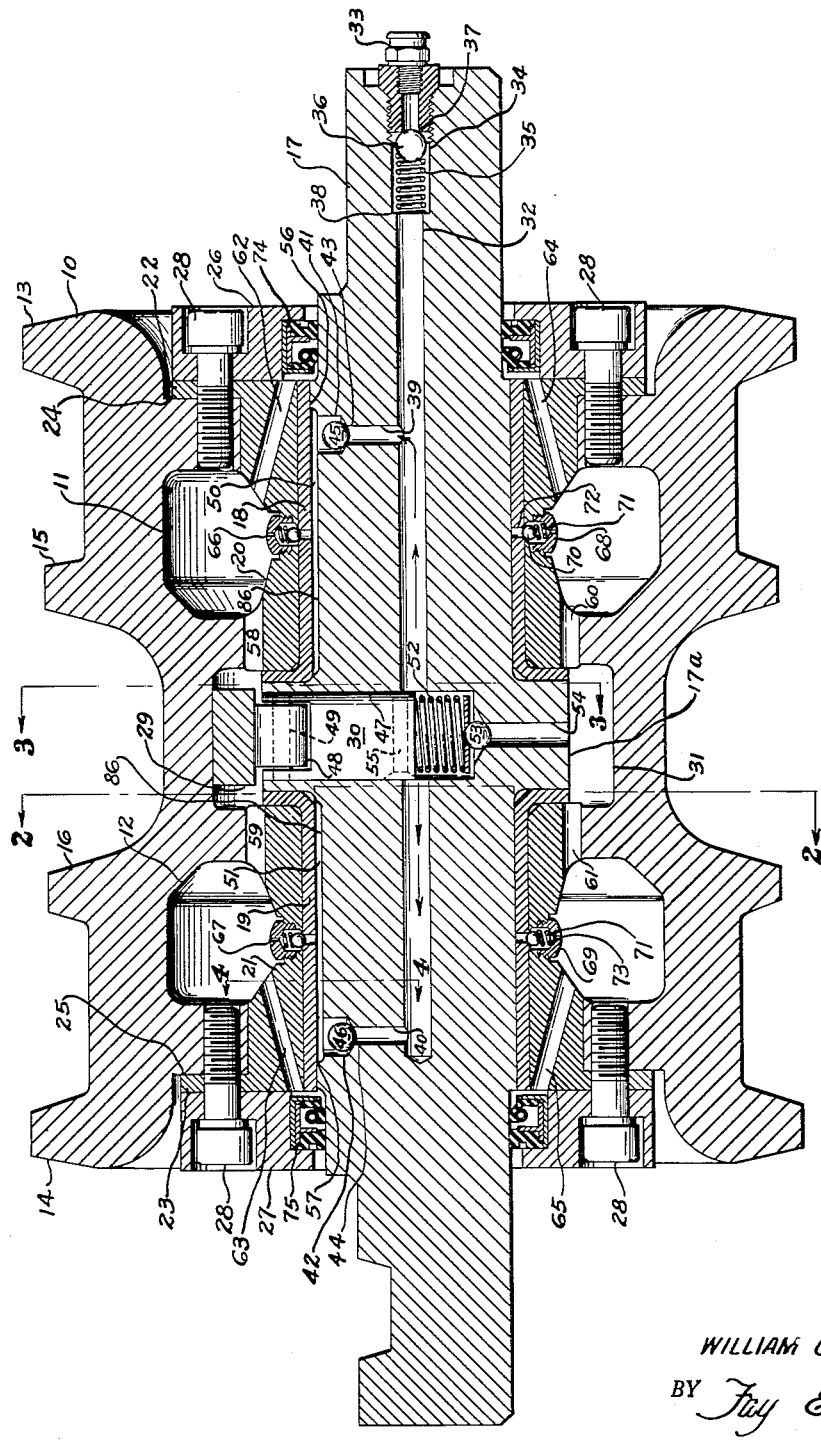

July 5, 1955    W. C. CARROLL    2,712,478
PRESSURE LUBRICATED TRACK TRACTOR ROLLER
Filed Sept. 25, 1951    3 Sheets-Sheet 1

INVENTOR.
WILLIAM CRAIG CARROLL
BY Fay & Fay
ATTORNEYS

INVENTOR.
WILLIAM CRAIG CARROLL
BY
Fay & Fay
ATTORNEYS

July 5, 1955 W. C. CARROLL 2,712,478
PRESSURE LUBRICATED TRACK TRACTOR ROLLER
Filed Sept. 25, 1951 3 Sheets-Sheet 3

INVENTOR.
WILLIAM CRAIG CARROLL
BY
Jay & Jay
ATTORNEYS 2,712,478
Patented July 5, 1955

2,712,478

PRESSURE LUBRICATED TRACK TRACTOR ROLLER

William Craig Carroll, Portland, Oreg.

Application September 25, 1951, Serial No. 248,238

4 Claims. (Cl. 308—187)

The present invention relates primarily to a novel design of track tractor roller for use with crawler type tractors and similar equipment employing pressurized lubrication in a novel combination. These track tractor rollers are particularly useful in an environment of grit, such as mud and dirt, to provide proper lubrication to all surfaces of the bearing and to exclude dirt from the confines of the track tractor roller.

The improvements embodied in this invention consist of a novel combination of a cam actuated pump to circulate lubrication to the bearing surface, as well as check means in the vicinity of the bearing surface, to hold the pressure to a desired maximum. Included in this combination are further structural elements to reduce the pressure in the vicinity of the seal on the shaft, in order that loss of lubricant will not be excessive through this opening, particularly in view of the pressurized lubrication. This combination of track tractor rollers, with pressurized lubrication therefor, is useful even with lip type elastomer seals, which are angulated outward and allow for a slight extrusion of lubricant over the bearing unit in order to flow away particles of dirt which may become embedded beneath the lips of the seal.

This invention further relates to a novel design of track tractor roller in which large lubricant capacity exists within the shell in order that the rollers of a tractor may be subjected to extreme conditions of usage in mud and dirt over long periods of service with slight lubricant extrusion past the seal and without undue wear or excessively frequent lubricant renewal.

This invention further relates to a pressurized track tractor roller in which lubricant is pressurized on the bearing surface but is relatively unpressurized in the vicinity of the lubricant seal on the shaft, in order to avoid excessive extrusion of lubricant past the seal. This particular type of track tractor roller is of the center thrust type, which is capable of withstanding heavy loads of a crawler type tractor without squashing out the lubricant between the shaft and the bearing while permitting side thrust from either side, particularly when the tractor is on a side hill. This pressurized track tractor roller is useful either with single or double rail tracks, whichever may be employed.

An object of this invention is to provide a pressurized track tractor roller with lubricant check valves surrounding the bearing surface and a relatively low pressure lubricant seal for said combination.

A further object of this invention is to provide a large lubricant storage space within the confines of the shell of the track tractor roller in order that there may be proper lubrication to all of the bearing surface even though a major part of the lubricant has worked out of the track tractor roller.

A further object of this invention is to produce a track tractor roller in which a cam actuated plunger pressurizes the lubricant in the vicinity of the bearing but confines it to that region in order that the balance of the lubricant within the shell, and particularly in the vicinity of the lubricant seals, is at relatively low pressure in order to permit the successful operation of the track tractor roller over long periods of time without extrusion of great quantities of lubricant.

A futher object of this invention is to produce a track tractor roller employing pressurized lubrication to the bearing surface of the roller, together with large lubricant storage capacity in the confines of the shell, while restricting the flow of the pressurized lubricant to the immediate vicinity of the bearing, and providing bleeder channels from the vicinity of the seal to the lubricant storage space in order that the bulk of the lubricant, particularly in the vicinity of the seals, will be at relatively low pressure, whereas the lubricant in the vicinity of the bearing will be at high pressure.

To the accomplishment of the foregoing and related ends, said invention then consists of the means hereinafter fully described and pointed out in the claims; the following description setting forth in detail certain novel features of construction and combination of parts which will be readily understood by those skilled in the art to which the invention appertains.

Figure 2:
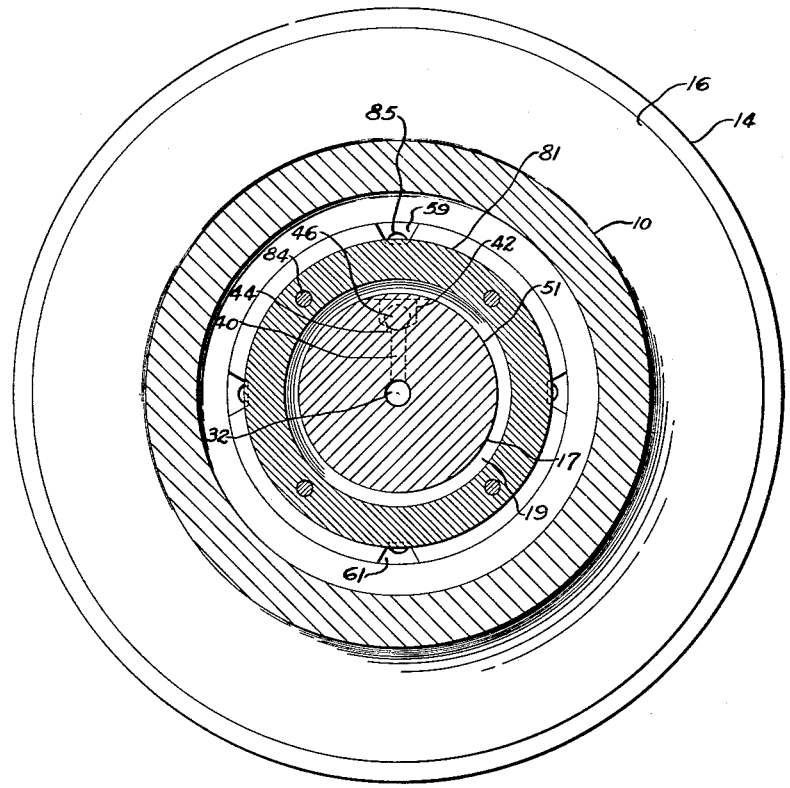
Figure 3:
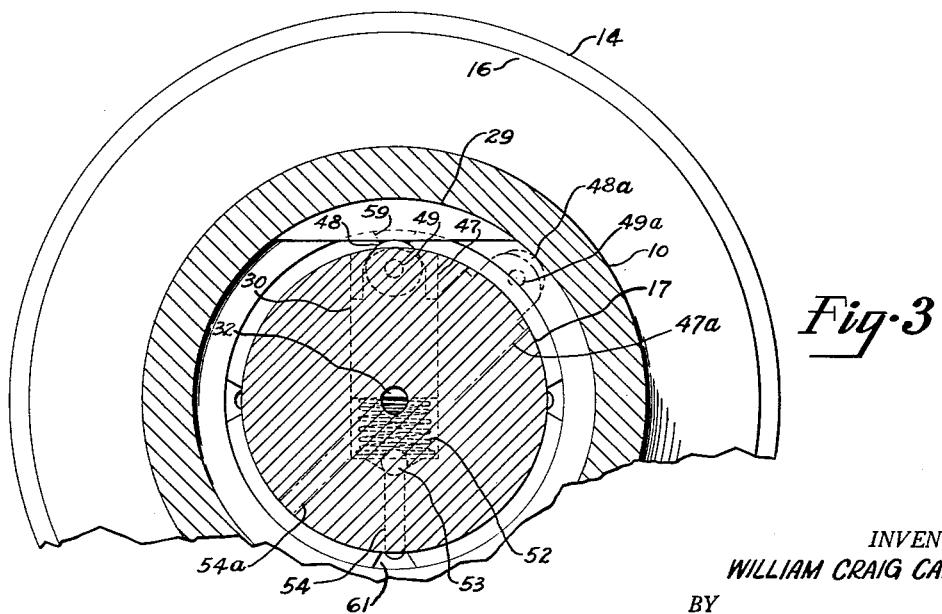
Figure 4:
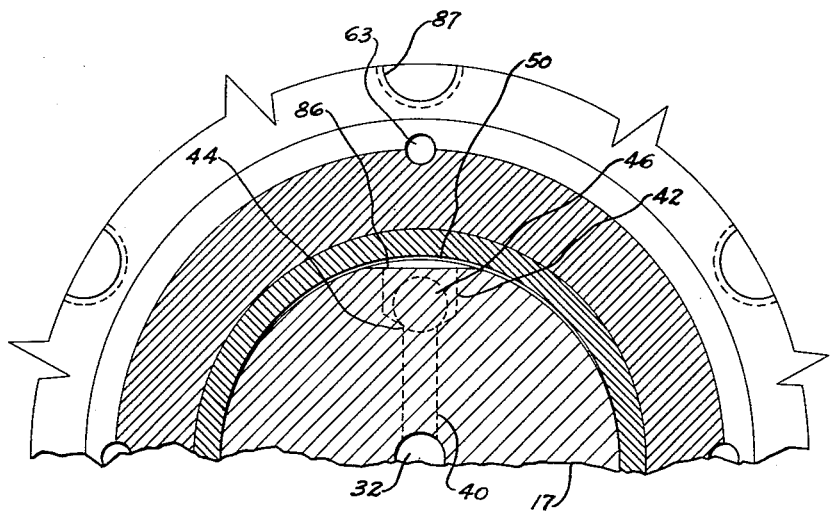
Figure 5:
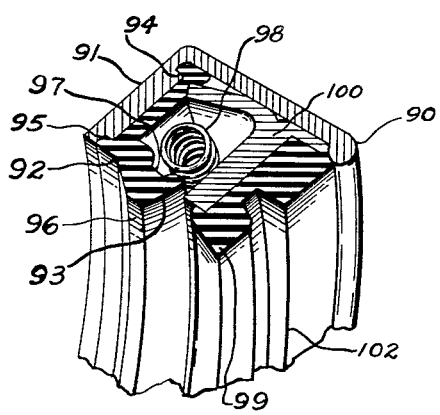

In the drawings, which illustrate one embodiment of the invention, Fig. 1 is a cross-sectional view of a pressurized track tractor roller, Fig. 2 is a transverse cross-section of the roller along lines 2—2 of Fig. 1 showing the left bearing thrust surface, Fig. 3 is a transverse cross-sectional view of the track tractor roller along the lines 3—3 of Fig. 1, looking to the left in Fig. 1, showing the construction of the lubricant pump, Fig. 4 is a fragmentary cross-sectional view of Fig. 1 along the lines 4—4 of Fig. 1, showing the construction of the lubricant passages to the bearing surface, and Fig. 5 is a fragmentary detailed view in perspective of the double lip lubricant seal preferably employed with this invention.

In this pressure lubricated track tractor roller Fig. 1 at 10 shows the outer shell which may be a single steel casting, possibly of high carbon manganese alloy steel, which makes it capable of being subjected to extremely rough surface conditions. This cast shell has particular advantage in that it permits part of the space within the outer cast shell to be used as an annularly shaped reservoir, designated 11 and 12 for the storage of lubricant. These reservoirs cause the outer thickness of the shell to be of approximate constant thickness for greater ease in casting of the shell. The shell may be of the double flange type, as shown here, on which there are a pair of outer flanges designated 13 to the right and 14 to the left, and similarly a pair of inner flanges 15 on the right and 16 on the left. These flanged surfaces contact the endless track chains of crawler type tractors, and through the medium of the track support the weight of the tractor. In usual practice there may be as many as five to seven pairs of these track tractor rollers supporting the load of heavy crawler type tractors, weighing up to 30 tons or more. The load upon these track tractor rollers is indeed enormous and the conditions of usage extreme. This particular track tractor roller has a large diameter axle 17, having a widened center portion 17a, which is used to absorb the side thrust on the axle. On either side of the center thrust portions there are a pair of bearings, 18 on the right and 19 on the left, which in turn are mounted on a pair of bearing carrier members, 20 on the right and 21 on the left. These bearing carrier members have flanged portions designated 22 on the right and 23 on the left, which extend over the external faces, 24 and 25, of the cast shell 10. Outwardly of the bearing carrier members there are seal housing members 26 and 27 mounted to the shell through openings in the bearing carrier members by means of cap screws 28. Thus it may be seen that all of these members, previously mentioned, rotate together as a unit including the bearing itself, around the shaft, which is stationary. The shaft in turn is secured to the side frame members of the track tractor roller by means of mounting blocks not shown. Within the cast shell there is an integral cam portion 29, which is in the shape of a chord on the circular portion of the shell and actuates the plunger type pump 30.

Thus it may be seen that on the interior side of the cast shell in this track tractor roller there are three lubricant reservoirs. These are the large lubricant reservoirs 11 and 12 to the right and left of the pump 30 and the central lubricant reservoir 31 seen connected to these reservoirs. Pump 30 provides lubrication to both sides of the bearing surfaces of this roller.

The exact manner in which the operation of this roller, and the parts subsequently to be described, can only be made clear is by an examination of Figures 2, 3 and 4, as well as the cross-sectional view in Fig. 1. For clarity, Fig. 1 will be briefly described as well as the manner in which the lubricant flows to all surfaces of the bearing, and part of this description will necessarily have to be repeated in connection with Figures 2, 3 and 4.

The remaining parts of this track tractor roller are most concerned with the flow of lubrication to the various bearing surfaces. These can be supplied best by tracing this flow of lubrication. Centrally of the axis 17, and extending along a greater portion of its length, is a lubricant channel 32. On the end of this channel there is a lubricant fitting 33. Inwardly of the fitting is a widened portion 34, which has a spring 35, and a ball 36 mounted therein. The internal opening to the fitting 37 is in contact with the ball 36, because of the pressure of the spring 35 against the end portion 38 of the enlarged diameter 34 within the bore. Thus it may be seen that should the fitting be accidentally removed or broken off, lubricant within the reservoir, under pressure, will cause the ball to seat and prevent a large loss of lubricant therethrough. The central channel 32 of the axle has two radial openings 39 and 40, which extend to enlarged portions 41 on the right and 42 on the left. Within these portions there is a seat 43 on the right and 44 on the left and balls 45 and 46, designed to contact the seat and seal the lubricant from flowing back into the central channel 32.

Centrally of the axle within the enlarged portion 17a there is a lubricant pump 30 with a plunger in an opening 47 of the axle, adapted to contact the internal surface of reservoir 31 and be actuated by the cam portion 29 secured within this reservoir. The plunger pump 30 has a roller 48 mounted on an axle 49, on one end of the pump. The roller is designed to contact the cam portion 29 and reciprocate within the cut-away portion 47 of the axle to force the lubricant to the bearing surface along channel 32 up the radial openings 39 and 40 to the bearing surfaces 50 and 51. On the other end of the plunger pump there is a spring 52 and a ball 53, which ball in turn seats against an opening in the axial passageway 54. In one end of the plunger pump there is an opening 55 to aid in the circulation of lubricant and to permit the ready mounting of the plunger pump within the cast shell for assembly.

The operation of the lubricant system is to force the lubricant within the central channel 32 outwardly through transverse openings 39 and 40, past seats 43 and 44, onto bearing surfaces 50 and 51, and then eventually into annular reservoirs 11 and 12. In order to force the lubricant in the manner described, check valve 53 closes as the ball seats into the lubricant passageway 54, so that the lubricant must go as previously described. On reverse stroke of the plunger pump 30, lubricant is drawn from the central reservoir 31, up through lubricant passage 54, filling the suction space of the pump, whence it is forced on the direct stroke into the central channel 32, to repeat the pumping cycle which is virtually a recirculation of lubricant.

Once the lubricant is on the bearing surfaces 50 and 51 it will travel along the bearing surfaces because the axle has a flattened portion 86 on the top side of the shaft to provide improved distribution for the lubricant.

This flattened portion of the shaft does not extend the full length of the bearing and stops just before the end of the bearing at about 56 on the right and 57 on the left. The lubricant will flow outwardly through radially shaped lubricant passageways not shown on the center thrust surfaces and into the central lubricant reservoir 31. It will be seen in addition that there are cut-away portions in the bearing carrier, which are designated 58 and 60 on the top and bottom right, and 59 and 61 on the top and bottom of the left side. These connect to the large lubricant reservoirs 11 and 12. From the outward side into the lubricant reservoir there are bleeder channels 62 on the right and 63 on the left top, and 64 and 65 on the bottom right and left respectively. These carry the lubricant away from the vicinity of the seal back to the low pressure area of the lubricant reservoirs 11 and 12.

Mounted within the bearing carrier members 20 and 21 there are a plurality of check valves 66 and 68 on the top and bottom right, and 67 and 69 on the top and bottom left. In all, there must be at least one and perhaps as many as four of these check valves. They are designed to retain the pressure on the bearing surface to at least 65 pounds per square inch, and a ball and spring 70 and 71, respectively, of check valve 68 are connected through an opening 72 in the bearing face to permit the lubricant to flow through this opening past the ball and spring if the pressure is great enough to compress it, and out through a similar opening 73. The remaining check valves are of similar construction.

By this construction of parts the lubricant on the bearing surface is held at relatively high pressure and between strokes of the plunger pump the balls 45 and 46, which seat at 43 and 44 on the axial lubricant passages 39 and 40, prevent the lubricant from flowing away from this area, and accordingly reducing the pressure. Thus in each stroke, as the shell revolves, some quantity passes seats 43 and 44 onto the bearing surfaces. Since these track tractor rollers rotate at from 150 to 350 or more revolutions per minute and are subjected to such rough conditions and heavy loads, they almost inevitably run hot and the need for lubrication is great. Thus this construction and combination of parts is believed to provide improved lubrication to the bearing surfaces, while at the same time controlling the flow of lubricant over this surface because of the check valves 66 through 69, as well as the restricted openings from the end of the bearing members.

On either end of the shaft, which is hardened, the clearance is reduced accordingly and there is no flat portion on the shaft. Thus it may be seen that lubricant flows by here at a reduced rate, and is not at the comparable pressure of the bearing surfaces. If the lubricant should occasionally be at high pressure within the vicinity of the seals, the bleeder channels 62 through 65 are designed to relieve this pressure, and to permit the lubricant to return to the annular lubricant reservoirs 11 and 12. Outwardly of these bleeder channels, the seals, which were previously mentioned, are located. These seals are designated 74 on the right and 75 on the left. They are of the double lip type, in which elastomer rings are angulated outward, which permit the extrusion of slight quantities of lubricant past the seal to flow away particles of dirt, which may become embedded between the seal and the shaft. In the immediate vicinity of the seals there is a portion cut away from the housing, so that the seals are exposed to the exterior conditions. By this we mean that there is no protective housing or covering, in which dirt may become lodged to force against the lips of the seals and wear them into the shaft.

Fig. 2 shows a cross section of the track tractor roller along the lines 2—2 of Fig. 1, that is, looking to the left in this view and in a transverse cross-section showing the cast shell 10 of a double flanged roller having a circular flange 16 on the interior side and 14 on the exterior side. In addition there is a shaft 17 shown in cross-section having a bore therethrough 32 and a radial passage 40 leading to a widened portion 42, having a seat therein 44 and a ball mounted on the seat. This is a lubricant passageway from the pump, not shown, through the axial bore 32 vertically through the radial passage 40 and outwardly to the bearing surface 51. Since this view is taken outwardly of the widened center portion of the flange 17a the pump does not show, but the flanged portion of the bearing 19 does at 81.

Between the shaft 17 and the bearing 19 there is a small amount of clearance, which in this view is exaggerated because of the angulated portion at the junction of the flanged portion of the bearing with the cylindrical portion. The bearing is secured to the bearing carrier 21 by means of dowels 84. At the outer surfaces of the bearing carrier there are a plurality of passageways 59 and 61 longitudinally of the axle, which permit the flow of lubricant from the central reservoir outwardly to the large lubricant reservoir 12. These passageways are designated 59 on top and 61 on the bottom. This provides an even flow of lubricant from the pressurized bearing surfaces radially outward along the flanged bearing surface to the axial passageways 59 and 61 in the bearing carrier and then to the reservoirs for subsequent re-use. In each of these passageways can be seen the bleeder channels 62 through 65, which project through the bearing carrier to the vicinity of the seal. These are shown at 85. In this figure four bleeder channels are shown, though in actual practice only two may be necessary.

Fig. 3 shows a cross-sectional view of the track tractor roller along lines 3—3 of Fig. 1 looking to the left of this figure, showing the detailed mechanism of the cam actuated pump both in its operative position and in its inoperative position. In this view the shell 10 may be seen with the flanges 14 and 16, as well as shaft 17, having a central passageway 32 for lubricant. Within a cut-away portion 47, which is transverse to the axle, there is a pump 30 having a roller 48 mounted on the outward side thereof in an axle 49. In the lower portion of the transverse opening 47 there is a spring 52 and a ball 53 seated in the small opening 54, which communicates with the central reservoir 31. An integral cam portion 29 partially fills the central reservoir and causes the pump to force lubricant to the bearing surfaces on each revolution of the track tractor roller. The position shown in dotted lines immediately to the right of the pump is the same pump in an extended position as it passes the cam 29. For convenience the pump has been shown as moving whereas in practice the roller and cam move relative to the pump. Thus in this view roller 28a is mounted on an axle 49a and the central opening in the shaft is shown at 47a and is connected to the lubricant passage 54a. The axial lubricant passageways 59 and 61 permit the lubricant to flow back and forth from the central reservoir 31 to the side reservoirs 11 and 12, all within the shell member 10.

A further cross-sectional view of the shell is shown in Fig. 4, which is a view of the internal mechanism somewhat enlarged in the cross section shown in Fig. 2, and illustrates in this view the central passage 32 in the axle 17, having a radial passageway 40 to an enlarged portion 42, forming a seat 44 for a ball 46. The lubricant passes up through this opening to the bearing surface 50 which has a partially flattened portion 86. As previously described, this flattened portion extends across the greater portion of the cylindrical bearing surface outwardly to the extreme edges thereof. In this manner lubricant is carried to all surfaces of the bearing but is sometimes controlled and restricted in its flow from the bearing surfaces by reduced clearance at the end of the bearing surface. This clearance may be about .003 or .004 inch. The greater portion of the lubricant is expected to flow radially outward in this clearance to the vicinity behind the seal and be carried by bleeder channels 63 and 65 to the lubricant reservoirs 11 and 12. A similar portion would travel along the axle to the flanged surfaces to the central lubricant reservoir. These bleeder channels, previously mentioned, are shown in this view and designated 63 at the top. Others are provided for at 90° relative to this bleeder channel. This view further shows a cross-sectional view of the interior of lubricant reservoir 12, and projected into this cavity are tapped holes for cap screws, generally designated 87. On the interior side of the lubricant seals there is a small annular chamber, which permits the lubricant to flow from any portion of the chamber to bleeder channels 63 and 65, back to the lubricant reservoir.

It is expected that the pressure on the lubricant behind the seals will not be more than about 14 pounds per square inch, whereas the pressure on the bearing surface may be upwards of 65 pounds. In this way the lubricant seals, which are of the double lip type about to be described, will not extrude excessive lubricant.

A preferred type of lubricant seal for this track tractor roller is shown in Fig. 5, where 90 shows a metallic ring having a retaining flange 91 projected radially inwardly towards the shaft. Securely bonded to the retaining flange is a fibrous sealing ring 92 of elastomer material annular in shape but L-shaped in cross section, having a central lip 93 which is inclined away from the retaining flange 91 and outwardly of the track tractor roller. Thus it may be seen that the lubricant under pressure will extrude past the sealing ring 92 and its central lip 93. Outwardly of this lip on the lower part of the L there is a grooved portion, behind which is mounted a coil spring 98. At the largest diameter of the L there is a projection 94, which fits into a complementary groove between the retaining flange 91 and the metallic ring 90. At the smaller diameter of the retaining flange and on the inside surface thereof, there is a small cut-away portion 95, into which the heel of the L-shaped ring is designed to fit. This prevents lubricant from flowing radially outward along the gap between the elastomer sealing ring 92 and the retaining flange 91 and provides a tight contact therebetween. The central lip 93 has a conically shaped portion 96 directed away from the retaining flange 91, which will flex under pressure of the lubricant from within the track tractor roller. The above mentioned portion 96 contacts a shaft through lip 93 and is stiffened by a cylindrical spring 98 against the grooved rear surface of the ring at 97.

In the novel position as used herein the sealing rings are directed angularly outwardly from the track tractor roller. Thus it may be seen that they permit a slight extrusion of lubricant past the seal if the pressure of the retaining spring 98 is not excessive. Ordinarily about 14 pounds of lubricant may be maintained within a track tractor roller by this sealing arrangement.

In addition to this sealing ring there is a second ring, or washer, of elastomer material spaced axially outward from sealing ring 92. This second sealing ring 99 is supported by an annular shaped ring 100, which is approximately parallel to the retaining flange 91. From the radially outward side of ring 100, the largest diameter, and against the metallic ring 90, there is an axial portion which extends into contact with the L-shaped sealing ring 92 at the top of the L and securely bonds this portion into a cut-away portion 94. This second elastomer sealing ring 99 is securely fastened to the annular portion 100, both at its largest diameter and at its minimum diameter and is bonded to this ring. Axially outward of the resilient rubber ring 99 there is an annular shaped groove 102 completely encircling the seal. This double lip type elastomer seal permits a slight extrusion of lubricant past the two rings 92 and 99, which flows away the dirt from between the rings and the shaft. The outer lip 99 particularly acts to exclude dirt and is unprotected, that is, has no outer housing member. Thus no dirt or grit can force against the outer surface of this lip to force it into the shaft and to wear grooves therein. Though I prefer to use this type of sealing means with this design of track tractor roller it will readily be seen that other types of seals may be used with this roller.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. In a track tractor roller having an axle with a center thrust portion, a roller, flanged sleeve bearings having confronting surfaces against the center thrust portion; lubricant seals between the roller and the axle; a lubricant pump within the axle and a lubricant system with passages to the bearing surface; restraining means on the bearing surface to restrain the flow of lubricant; annularly shaped lubricant storage spaces within the roller with passages to said lubricant pump and connecting passageways from the seal to said lubricant storage spaces whereby lubricant is forced by the pump to the bearing surfaces and retained therein at high pressures, and flows outwardly therefrom at reduced pressure to the said annularly shaped lubricant storage spaces, which are connected to the lubricant pump, in order that the lubricant pressure behind the seals can be at relatively low pressure to permit the extrusion of a slight amount of lubrication past the seal.

2. In a track tractor roller having a roller, an axle with a center thrust portion; bearing and bearing carrier members therefor within said roller having confronting surfaces with said axle and flanged portions against said center thrust portion; lubricant sealing means between said roller and axle; a suction lubricant pump within the axle actuated by a cam on the roller, lubricant passages from the pump to the interior of the roller and to the bearing surfaces; three annularly shaped lubricant reservoirs outwardly of the bearing carrier members in the roller; and axial lubricant passages from said lubricant reservoirs to the middle reservoir supplying the lubricant pump on its suction stroke; means within the bearing and bearing carrier members to control the pressure of lubricant upon the bearing surfaces; means within the axle for checking the back flow of lubricant from said bearing surfaces and means within the said carrier members to relieve the pressure of lubricant in the immediate vicinity of the seals, to the lubricant reservoirs, whereby the lubricant pump forces lubricant to the bearing surfaces at high pressure, where it is retained except for leakage past the ends of the bearings until the next stroke of the pump, together with the means for relieving the pressure in the vicinity of the lubricant seals by permitting flow of lubricant therefrom to the relatively low pressure reservoirs.

3. In a self-contained bearing and lubrication unit; an axle, a roller, a bearing carrier and bearing secured thereto, confronting bearing surfaces between said bearing and the axle; said roller having a plurality of spaced annular cavities interiorly of the roller; said bearing carrier having a plurality of cavities therein connected to the bearing surfaces and supplementing said cavities in the roller to form lubricant reservoirs for the unit; pumping means within the axle actuated by the roller for forcing lubricant to the bearing surfaces; restraining means in the bearing and bearing carrier and in the axle for retaining the lubricant on the bearing surfaces; lip type lubricant seals between the roller and the axle; bleeder channels from behind the seals to the lubricant reservoirs whereby the pump forces lubricant to the bearing surfaces at high pressure and restrains it therein, permitting the flow of lubricant therefrom at lower pressures back to the lubricant pump with further passageways from the vicinity of the seal to relieve any excess pressure which develops adjacent thereto to be returned to the lubricant reservoirs.

4. In a self-contained bearing and lubrication unit, a non-rotating axle, a roller, a bearing and bearing carrier secured thereto having confronting bearing surfaces between said bearing and the axle, means within the roller for the storage of lubricant, connecting means in said bearing carrier to said means within the roller for the storage of lubricant, pumping means within the axle actuated by the roller for forcing lubricant to the bearing surfaces, restraining means in the bearing and bearing carrier and in the axle for retaining the lubricant on the bearing surface, said restraining means in the axle comprising a ball check valve in the upper portion of the non-rotating axle, a lubricant seal between the roller and the axle, means for relieving the pressure adjacent the seal whereby pressure from the pump is forced to the bearing surface and restrained therein, and prevented between pump strokes from refilling the passage way to the pump.

References Cited in the file of this patent

UNITED STATES PATENTS

| | | |
|---|---|---|
| 2,351,909 | Beretish | June 20, 1944 |
| 2,490,027 | Carr | Dec. 6, 1949 |